(No Model.) 2 Sheets—Sheet 1.
C. CLINCH.
APPARATUS FOR BREWING.
No. 403,252. Patented May 14, 1889.
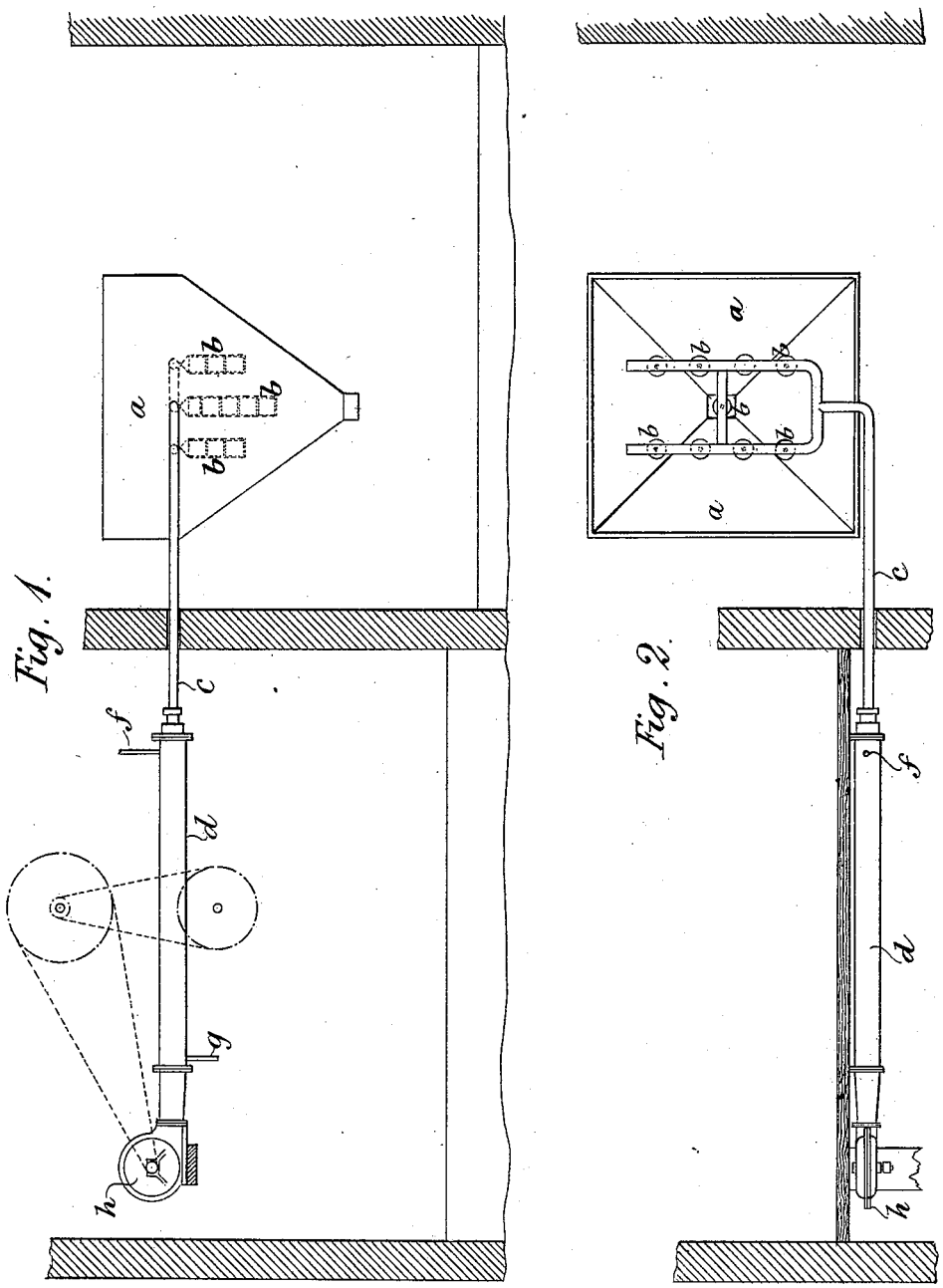

(No Model.) 2 Sheets—Sheet 2.
C. CLINCH.
APPARATUS FOR BREWING.
No. 403,252. Patented May 14, 1889.
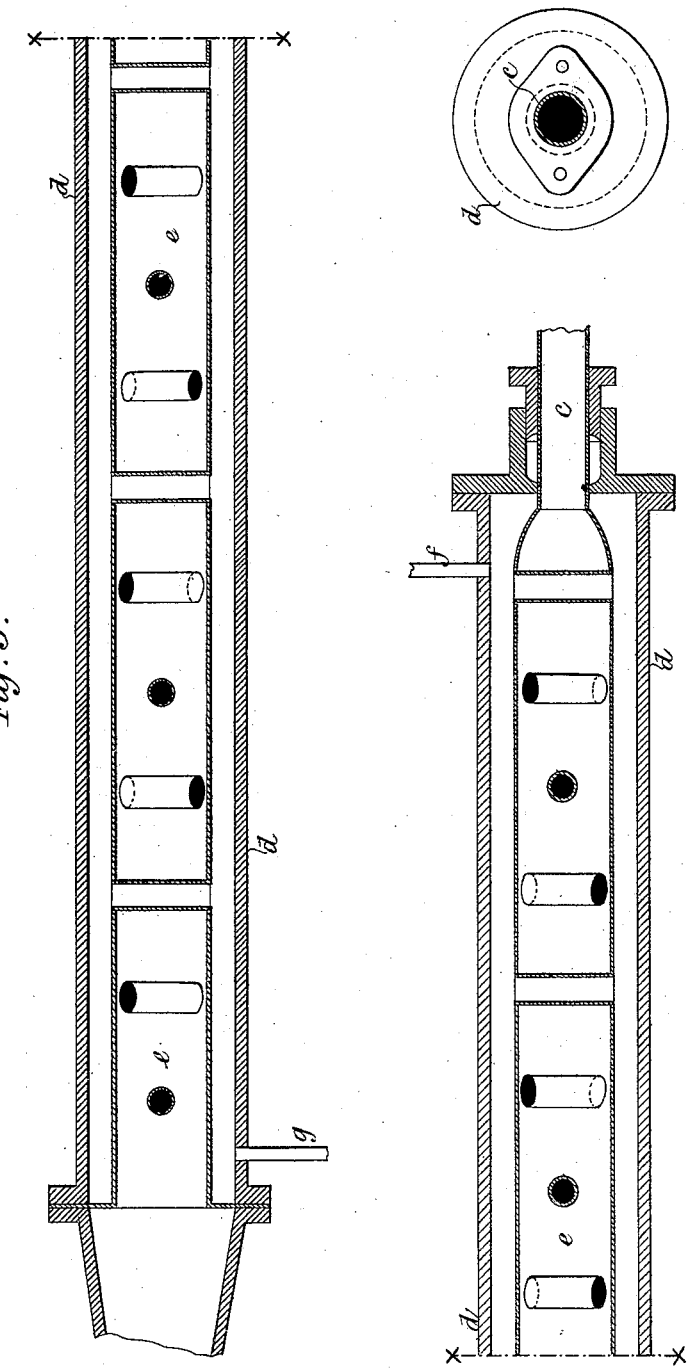

UNITED STATES PATENT OFFICE.

CHARLES CLINCH, OF LEEDS, COUNTY OF YORK, ENGLAND.

APPARATUS FOR BREWING.

SPECIFICATION forming part of Letters Patent No. 403,252, dated May 14, 1889.

Application filed July 5, 1887. Serial No. 243,394. (No model.)

*To all whom it may concern:*

Be it known that I, CHARLES CLINCH, brewer, a subject of the Queen of Great Britain, residing at 8 Brunswick Place, Leeds, in the county of York, England, have invented certain new and useful Improvements in Apparatus for Brewing, of which the following is a specification.

The object of this invention is to warm the ground malt before it is mashed, so that the temperature of the water in the mash-tun shall not be lowered by the introduction of the malt. For this purpose I pass heated air through the ground malt, by preference while it is in the hopper above the mash-tun, until it has been raised to the proper temperature. The air may be heated and driven through the malt in any convenient manner. I prefer, however, to heat it by passing it through tubes surrounded by steam.

In order that my said invention may be most fully understood and readily carried into effect, I will proceed to describe the drawings hereunto annexed.

In the drawings, Figure 1 is an elevation, and Fig. 2 is a plan, of apparatus arranged in the manner which I prefer for carrying my invention into effect. Fig. 3 shows to a larger scale a longitudinal section of the air-heater which I employ.

$a$ is a hopper into which the grist as it comes from the mill is received, and it is allowed to accumulate in this hopper until the hopper is nearly full and contains the quantity required for a mashing operation. Within this hopper a series of cylinders, $b\ b\ b$, of finely-perforated sheet-copper, are arranged, and these are all connected with an air-main, $c$. This air-main communicates with the air-heater $d$, consisting of a cylinder or jacket, to which boiler steam is admitted, and an air-conduit, $e$, which is a continuation of the main $c$. Steam is admitted to the jacket by a pipe, $f$, and there is an outlet at $g$ for the steam and water produced by condensation. The air-conduit within the steam-jacket is larger in diameter than the rest of the air-main, and is provided also with a series of transverse tubes, into which steam can enter. These tubes serve to increase the heating area.

$h$ is a fan driven in any convenient manner, and this fan forces air through the heater and into the air-main.

The air in the passage through the heater is raised in temperature, and in this state it passes on into the cylinders $b\ b$ within the hopper $a$. The heated air escapes through the perforations in the walls of these cylinders and finds its way among the grist.

The passage of the hot air among the grist is continued for some hours until the necessary grist is raised to about the mashing temperature. The passage of air is then discontinued, and when convenient the mashing operation is commenced. At the time of mashing the grist is let down from the hopper into the mashing-tun and intimately mixed with the hot water in the usual manner.

Without departing from the nature of my invention the details which I have described may be much varied. Nevertheless I prefer to operate in the manner and by means of the apparatus hereinbefore described.

I am aware that it is old to heat cornmeal in a kiln for distillation purposes, and that it has also been proposed to heat malt before grinding; but such methods differ essentially from mine, which consists in heating ground dry malt by dry air permeating its mass, so as to raise its temperature, but leave it unaffected otherwise, as it goes to the mashing-tun. Malt differs essentially from grain so far as the brewers' art is concerned, and brewing and distillation are essentially different processes as regards the former art. Consequently the processes of disintegrating, grinding, heating, or steaming grain have no relation to the method of treating malt as a step in the art of brewing as herein claimed.

A distinguishing peculiarity of my process is that the malt is dried by air heated by low steam. The temperature of the malt never rises above 212° Fahrenheit, which is a safe limit for working.

Having now particularly described and ascertained the nature of my said invention and in what manner the same is to be performed, I declare that what I claim is—

1. The hereinbefore-described apparatus for treating malt in brewing, consisting of the combination of the hopper for containing the malt, the heater, a fan which drives air through the heater, the perforated air-distributer in the hopper, adapted to be immersed in the malt, and through which the hot air is distributed into the malt, substantially as set forth.

2. The hereinbefore-described apparatus for treating malt in brewing, consisting of the combination of the steam-jacket, its inlet and outlet pipes, the fan, the air-conduit connected with the fan and inclosed in the steam-jacket, the transverse steam-tubes in the air-conduit, the air-main, the hopper, and the perforated air-cylinders in the hopper, connected with the air-conduit, through which the heated air is delivered to the malt, substantially as set forth.

CHARLES CLINCH.

Witnesses:
    HERBERT E. DALE,
    WALTER J. SKERTEN,
*Both of* 17 *Gracechurch Street, London, E. C.*